United States Patent [19]

Clarridge

[11] 4,029,269
[45] June 14, 1977

[54] TAPE DRIVE WITH FLOATING-PLATE-MOUNTED DRIVE SPINDLES

[75] Inventor: Glenn E. Clarridge, Portland, Oreg.

[73] Assignee: Ford Industries, Inc., Portland, Oreg.

[22] Filed: Nov. 28, 1975

[21] Appl. No.: 636,059

[52] U.S. Cl. .......................................... 242/201
[51] Int. Cl.$^2$ ........................................ G11B 15/30
[58] Field of Search .......... 242/201, 204, 198, 180, 242/181, 202, 203, 208, 206, 209, 210, 67.4

[56] References Cited
UNITED STATES PATENTS

| | | | |
|---|---|---|---|
| 3,133,710 | 5/1964 | Herterich | 242/201 |
| 3,417,936 | 12/1968 | Paape | 242/201 |

Primary Examiner—George F. Mautz
Attorney, Agent, or Firm—Kolisch, Hartwell, Dickinson & Stuart

[57] ABSTRACT

A tape drive apparatus in which a pair of support mechanisms for two different recording tapes are mounted on a main deck, with drive for supported tapes being provided by a pair of rotary drive spindles that are carried on a floating subdeck which is mounted for limited pivoting and translating relative to the main deck. Mechanism is provided for shifting the subdeck to several different positions wherein the drive spindles which it carries are caused selectively to engage tires on rotary elements which form parts of the tape support mechanisms.

5 Claims, 1 Drawing Figure

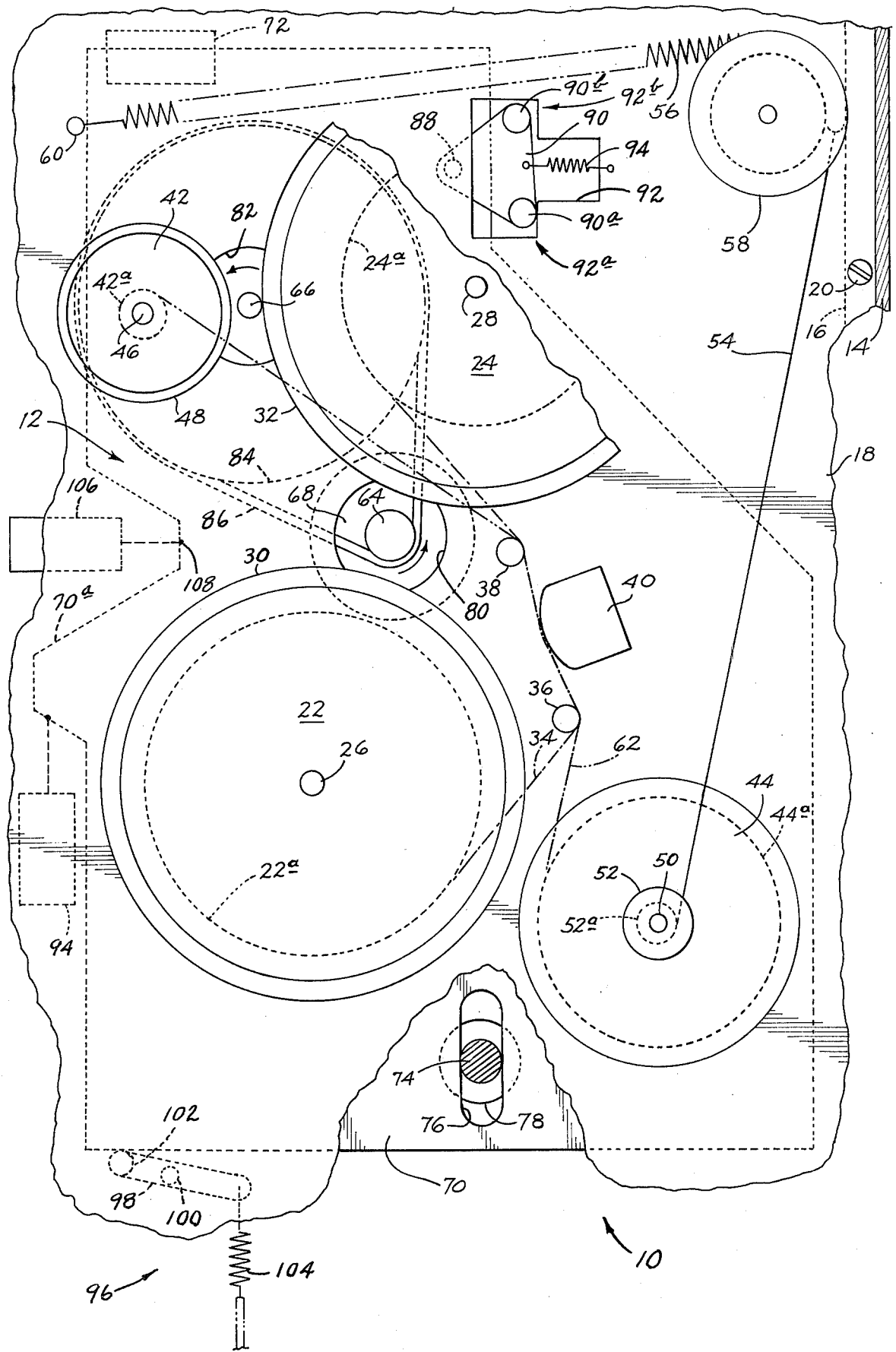

TAPE DRIVE WITH FLOATING-PLATE-MOUNTED DRIVE SPINDLES

BACKGROUND AND SUMMARY OF THE INVENTION

This invention pertains to a tape drive apparatus, and more particularly, to such an apparatus which is especially adapted for use in a telephone answering device and like equipment.

In a conventional telephone answering device, two different recording tapes are used. One of these tapes is referred to generally as an announcement tape, and the other as a message tape. The announcement tape is usually a relatively short tape on which the owner of an answering device records a message which he wishes to have placed out to a calling party. The message tape is generally a considerably longer tape onto which a calling party is invited to record a message.

Inasmuch as an answering device is used, normally, unattended, it is desirable that it be capable of performing its intended functions as reliably as possible. Further, since more and more people have found the desirability of having their telephones, in their absences, attended, so-to-speak, it is further desirable to make such equipment available in as inexpensive a form as possible.

In achieving these two objectives it is, of course, important to minimize as much as possible the complexity of an answering device.

A general object of the present invention is to provide a unique tape drive apparatus usable in a telephone answering device, and the like, which takes the above-mentioned considerations into account in a practical and satisfactory manner.

Proposed according to the present invention is a tape drive apparatus in which a pair of support mechanisms for two different recording tapes are mounted on a main deck. These two support mechanisms are for carrying tapes, such as an announcement tape and a message tape of the type referred to above. Drive for tapes which are supported by these mechanisms is provided by a pair of rotary drive spindles that are carried on a floating subdeck which is mounted for limited pivoting and translating relative to the main deck. Mechanism, including a pair of solenoids, and a hand-operated linkage, is provided for shifting the subdeck to different selected positions wherein the drive spindles selectively engage tires on rotary elements which form parts of the tape support mechanisms, thus selectively to drive the tapes supported by the tape support mechanisms.

Apparatus of this type is, in numerous ways, considerably simpler than many kinds of tape drive apparatus which are now available commercially. Reliability has been found to be extremely high.

These and other objects and advantages which are attained by the invention will become more fully apparent as the description which now follows is read in conjunction with the accompanying drawing.

DESCRIPTION OF THE DRAWINGS

The single drawing Figure is a fragmentary, somewhat schematic plan view, with certain portions broken away, illustrating a tape drive apparatus as contemplated by the present invention used in the setting of an otherwise conventional telephone answering device.

DETAILED DESCRIPTION OF THE INVENTION

Considering now what is shown in the drawing, indicated generally and fragmentarily at 10 is a portion of a telephone answering device including a tape drive apparatus 12 which is constructed in accordance with the present invention. A portion of the main housing in the answering device is shown at 14 — this housing including ledges, such as ledge 16, on which the main deck 18 in the drive apparatus is mounted as by screws, such as screw 20. Main deck 18 is a substantially planar deck, preferably formed of sheet metal, and is rigidly secured in place in the answering device.

As is contemplated by the present invention, main deck 18 carries two different support mechanisms for supporting two different recording tapes in the answering device. One of these support mechanisms includes the two spools, or rotary elements, shown at 22, 24, — the former acting as a supply spool for an incoming message recording tape, and the latter acting as a take-up spool for this tape. Spool 22 is rotatably mounted on the top of deck 18 through a spindle 26 — with this spool including a hub 22a on which tape is stored. Similarly, spool 14 is rotatably mounted on the top of deck 18 through a spindle 28. Spool 24 includes a hub 24a for receiving tape. Suitably mounted on the outside of spools 22, 24 are conventional rubber tires 30, 34, respectively, through which drive is imparted to these spools as will be explained.

Extending between spools 22, 24 in the drawing is a magnetic recording tape shown generally by the dash-dot line 34. As can be seen, tape 34 extends between the spools over a pair of idlers 36, 38 between which is located a conventional record-erase-playback head 40. Tape 34 is referred to herein as the message tape.

The other support mechanism herein includes a pair of spools, or rotary elements, 42, 44. Spool 42 is rotatably mounted on top of deck 18 through a spindle 46 — this spool including a hub 42a for taking up an announcement tape. A rubber tire 48 is suitably mounted on the outside of spool 42, through which tire rotary drive is imparted to this spool. Spool 44 is rotatably mounted on top deck 18 through a spindle 50 — this spool including a hub 44a for storing an announcement tape. Forming a part of spool 44 is a cylindrical axial projection 52, including a hub 52a which receives in windings one end of an elongated cord 54. The other end of cord 54 is attached to an elongated biasing spring 56 which is trained over an idler 58 that is rotatably mounted on top of deck 18. The end of spring 56 opposite that which connects with cord 54 is anchored on top of deck 18 through an anchor 60.

Spool 44 functions as a supply spool for an announcement tape, and spool 42 functions as a take-up spool for this tape. An announcement tape extending between these spools is shown by dash-double-dot line 62. As can be seen, tape 62 also extends over idlers 36, 38. Tapes 34, 62 are disposed at two different elevations with respect to the top of deck 18 — the former being closer to the top surface of the deck than the latter. Where tape 62 extends between idlers 36, 38, it extends over another record-erase-playback head (not shown) such as previously mentioned head 40.

Rotary drive for spools 22, 24, 42 is imparted herein through a pair of power-operated drive spindles 64, 66. Spindle 64, which is of considerably larger diameter than spindle 66, takes the form of the output drive shaft of an electric motor 68 which is suitably mounted on a generally planar subdeck 70 that is constructed and mounted herein in accordance with the invention. More specifically, subdeck 70 is disposed beneath deck 18, and is oriented in a plane which substantially parallels the plane of deck 18. In accordance with an important feature of the invention, subdeck 70 is, more particularly, mounted for limited pivoting and translating relative to deck 18. The means mounting subdeck 70 includes a shelf 72 which is joined to the main deck — which shelf slidably receives the underside of subdeck 70, and a pin and slot connection, including a downwardly projecting pin 74 that is anchored to the main deck, which pin extends downwardly through an elongated slot 76 that is formed in subdeck 70. A washer 78 is suitably anchored to pin 74, beneath subdeck 70, to provide another shelf vertically supporting the subdeck.

Spindle 64 projects upwardly through an opening 80 which is provided in deck 18. In particular, this spindle projects in the space between spools 22, 24 to a position where it may be moved, as will be explained, selectively to contact either of tires 30, 32. Spindle 66, which projects upwardly through an opening 82 in deck 18 is carried by a flywheel 84 which is suitably rotatably mounted on subdeck 70. Flywheel 84 is driven by a belt 86 which couples the flywheel to spindle 64.

When motor 68 operates, it turns spindle 64 in the direction of the arrow shown adjacent this spindle. Such action results in turning of spindle 66 in the direction of the arrow shown adjacent this spindle.

Mounted through a pivot connection 88 on subdeck 70 is a generally triangularly shaped rocker arm 90, which is also referred to herein as an interaction means. Rocker arm 90 is mounted for pivoting in a plane paralleling those of deck 18 and subdeck 70. Formed integrally with the rocker arm are two spaced-apart upwardly extending projections, or fulcrum portions, 90a, 90b. These projections project through a generally T-shaped opening 92 which is provided in main deck 18. A biasing spring, or means, which is under tension, and which is shown at 94, acts between the rocker arm and deck 18. It will be noted that with the various parts in apparatus 12 in the positions shown for them in the drawing, projections 90a rests against deck 18 generally in corner 92a of opening 92. Projection 90b is out of contact with the main deck in the region of corner 92b in opening 92.

Further included in apparatus 12 is what is referred to as a translating means — this means including a solenoid 94 and a mechanical push-pull mechanism 96. The solenoid is mounted on the underside of deck 18. The armature of solenoid 94 is suitably connected to an ear 70a which is formed in subdeck 70. Mechanism 96 includes a lever 98 which is pivoted to main deck 18 at 100. Formed on the left end of lever 98 in the drawing is a projection 102 which engages the bottom edge of subdeck 70 in the drawing. The right end of lever 98 in the drawing is connected to a spring 104 through which a pull may be exerted on the lever through digitally operable actuation mechanism not shown. Details of such an actuation mechanism form no part of the present invention. Completing a description of what is shown in the drawing, indicated at 106 is another solenoid whose armature is suitably connected at 108 to subdeck 70. Solenoid 106 is also mounted on the underside of deck 18.

Explaining now how the apparatus of the invention operates, when it is desired to record an announcement on tape 62, solenoid 106 is energized in any suitable manner, which action results in rocking of the subdeck counterclockwise in the drawing to place drive spindle 66 against tire 48. Such action, and with motor 68 operating, causes clockwise rotation of spool 42 in the figure to take up tape 62 from spool 44. With taking up of this tape, spool 44 rotates in a clockwise direction, with hub 52a taking up cord 54 against the action of spring 56. The desired announcement is then recorded in the usual manner on tape 62.

With completion of recording of the announcement, solenoid 106 is deenergized and motor 64 stopped, whereupon biasing spring 94 returns subdeck 70 to the position in which it is shown in the drawing. As a consequence, spindle 66 is returned to a position contacting tire 32. With disengagement of spindle 66 and tire 48, spring 56 and cord 54 rotate spool 44 in the counterclockwise direction to rewind the announcement tape back onto spool 44.

A similar type operation takes place when the answering device is set up to answer incoming calls, whereby on an incoming call being responded to, the subdeck is rocked to place spindle 66 again in contact with tire 48. Of course, under these circumstances, no announcement is being recorded on tape 62, but rather the previously recorded announcement is being played out. With complete playing out of the announcement, and deenergizing of solenoid 106, the subdeck again returns to the position in which it is shown in the drawing, with spindle 66 contacting tire 32. In this situation, however, motor 62 continues operating, whereupon spindle 66 drives spool 24 in a clockwise direction in the figure to move message tape 34 in what might be thought of as the forward direction to enable the calling party to record a message.

On completion of recording of a message, solenoid 94 is energized to pull downwardly on ear 70a. With such downward pulling (in the drawing figure) on the subdeck, spindle 64 engages tire 30. Further, projection 90a bottoms out in corner 92a of opening 92, whereupon rocker arm 90 effects counterclockwise rocking or pivoting of the subdeck. With engagement of spindle 64 and tire 30, spool 22 rotates in a clockwise direction in the figure to rewind tape 34. Because of the size difference, mentioned earlier, between spindles 64, 66, the speed at which spindle 64 rotates spool 22 is considerably greater than that at which spindle 66 rotates spool 24. Counterclockwise rocking of the subdeck as mentioned results in movement of spindle 66 to a position out of contact with both tire 48 and tire 32.

With completion of such a rewinding operation, solenoid 94 is suitably deenergized, whereupon spring 94 returns the subdeck to the position in which it is shown in the drawing.

When it is desired to move the message tape in a fast-forward mode of operation, the actuation mechanism mentioned earlier which is connected to spring 104 is operated to pull on the spring, and hence, on the right side of lever 98 in the drawing. This results in projection 102 pushing upwardly on subdeck 70, whereupon projection 90b bottoms out in corner 92b of opening 92. Such bottoming-out action results in slight clockwise rocking of the subdeck again to shift spindle 66 out of contact with both tires 48 and 32. Spindle 64 contacts tire 32 whereupon tape 34 is driven forward at a relatively high speed.

The various means by which actuation of the solenoids described occurs at the correct points in time are completely conventional in construction, and may take any one of a variety of forms well known to those skilled in the art. Hence, such means are not gone into in any detail herein.

It will thus be apparent that an extremely simple drive apparatus is proposed by the invention. With subdeck 70 mounted for translating and pivoting as described, and with rocker arm 90 constructed to function as described with respect to opening 92 in the main deck, operation of either solenoid 94 or of mechanism 96 to translate the subdeck so as to choose contact between spindle 64 and either of tires 30, 32, automatically results in pivoting of the subdeck so as to move spindle 66 out of contact with either of tires 48, 32. There, thus, results a mechanism which makes extremely efficient use of a single drive motor driving two drive spindles for handling a pair of recording tapes. Movement of the subdeck to place spindle 66 in contact with tire 48 to drive the announcement tape in a forward direction is readily effected by operation of solenoid 106 which pivots the subdeck far enough to produce such contact.

It will be apparent that the relative sizes of the spools and of the drive spindles may be chosen to effect whatever tape movement speeds are desired. Further, the exact configurations of the main deck and subdeck, and the locations of parts thereon may be adjusted to suit different needs. In other words, it will be evident from the description which has just been given how a pin and slot connection, and a rocker arm, may be associated with a main deck and a floating subdeck to produce rocking or pivoting of the subdeck in response to translation of the deck so as to adjust the position of drive spindle 66.

Thus, while a preferred embodiment of the invention has been described, it is appreciated that variations and modifications may be made without departing from the spirit of the invention.

What is claimed and desired to secure by letters patent is:

1. Tape drive apparatus comprising
a generally planar main deck,
tape support means mounted on said deck for supporting a length of recording tape for reversible movement, said support means including a pair of rotary elements with one being drivable in a selected direction to transport supported tape in one direction, and the other being drivable in a selected direction to transport supported tape in the reverse direction,
a generally planar subdeck,
means mounting said subdeck in parallel-planar spaced relation on said main deck, said mounting means being constructed to accommodate both pivoting and translating of the former (in its plane) relative to the latter,
translating means operatively connected to said subdeck for producing selected, reversible, limited translation thereof,
interaction means operatively interposed between said main deck and subdeck, operable to cause pivoting of the latter in one direction with operation of said translating means to produce translation of the subdeck in one direction, and pivoting of the subdeck in the opposite direction with operation of the translating means to produce translation of the subdeck in the opposite direction,
a pair of spaced, power-operated rotary drive spindles mounted on said subdeck and projecting toward said main deck to positions laterally adjacent said pair of rotary elements one of said spindles being engageable with said one element, and being constructed and operable when so engaged to drive said one element at one speed in its said selected direction, and the other spindle being engageable with said one element, and being constructed and operable when so engaged to drive said one element at a speed greater than said one speed in its said selected direction, and further being engageable with said other element to drive it in its said selected direction, and
biasing means acting between said main deck and subdeck normally urging the two toward relative positions wherein said one spindle engages said one rotary element, and said other spindle is disengaged from both rotary elements,
pivoting of said subdeck in said one direction under the influence of said translating and interaction means causing disengagement of said one spindle and rotary element and engagement of said other spindle and said one element, and pivoting of the subdeck in the opposite direction under the same influence causing disengagement of said one spindle and rotary element, and engagement of said other spindle and said other rotary element.

2. The apparatus of claim 1, wherein said mounting means includes a pin and slot connection between said main deck and subdeck.

3. 3. The apparatus of claim 2, wherein said interaction means includes a rocker arm pivoted on said subframe for swinging in a plane generally paralleling the plane of the subframe, said rocker arm including a pair of spaced fulcrum portions, one of which alone operatively interacts with said main frame to cause pivoting of the subframe during translating of the same in said one direction, and the other of which alone operatively interacts with said main frame to cause pivoting of the subframe during translating of the same in the opposite direction.

4. Tape drive apparatus comprising
a generally planar main deck,
tape support means mounted on said deck for supporting a length of recording tape for reversible movement, said support means including a pair of rotary elements with one being drivable in a selected direction to transport supported tape in one direction, and the other being drivable in a selected direction to transport supported tape in the reverse direction,
a generally planar subdeck,
means mounting said subdeck in parallel-planar spaced relation on said main deck, said mounting means being constructed to accommodate both pivoting and translating of the former (in its plane) relative to the latter,
translating means operatively connected to said subdeck for producing selected, reversible, limited translation thereof,
interaction means operatively interposed between said main deck and subdeck, operable to cause pivoting of the latter in one direction with operation of said translating means to produce translation of the subdeck in one direction, and pivoting of the subdeck in the opposite direction with operation of the translating means to produce translation of the subdeck in the opposite direction, and interaction means including a rocker arm pivoted on said subframe for swinging in a plane generally paralleling the plane of the subframe, with the rocker arm including a pair of spaced fulcrum portions, one of which alone operatively interacts with said main frame to cause pivoting of the subframe during translating of the same in said one direction, and the other of which alone operatively interacts with said main frame to cause pivoting of the subframe during translating of the same in the opposite direction, a pair of spaced, power-operated rotary drive spindles mounted on said subdeck and projecting toward said main deck to positions laterally adjacent said pair of rotary elements, one of said spindles being engageable with said one element, and being constructed and operable when so engaged to drive said one element at one speed in its said selected direction, and the other spindle being engageable with said one element, and being constructed and operable when so engaged to drive said one element at a speed greater than said one speed in its said selected direction, and further being engageable with said other element to drive it in its selected direction, and biasing means acting between said main deck and subdeck normally urging the two toward relative positions wherein said one spindle engages said one rotary element, and said other spindle is disengaged from both rotary elements, pivoting of said subdeck in said one direction under the influence of said translating and interaction means causing disengagement of said one spindle and rotary element and engagement of said other spindle and said one element, and pivoting of the subdeck in the opposite direction under the same influence causing disengagement of said one spindle and rotary element, and engagement of said other spindle and said other rotary element.

5. Tape drive apparatus comprising a generally planar main deck, tape support means mounted on said deck for supporting a length of recording tape for reversible movement, said support means including a pair of rotary elements with one being drivable in a selected direction to transport supported tape in one direction, and the other being drivable in a selected direction to transport supported tape in the reverse direction, another tape support means mounted on said main deck for supporting a length of recording tape for reversible movement, said other support means including a rotary element drivable in a selected direction to transport a supported tape in one direction, a generally planar subdeck, means mounting said subdeck in parallel-planar spaced relation on said main deck, said mounting means being constructed to accommodate both pivoting and translating of the former (in its plane) relative to the latter, translating means operatively connected to said subdeck for producing selected, reversible, limited translation thereof, interaction means operatively interposed between said main deck and subdeck, operable to cause pivoting of the latter in one direction with operation of said translating means to produce translation of the subdeck in one direction, and pivoting of the subdeck in the opposite direction with operation of the translating means to produce translation of the subdeck in the opposite direction a pair of spaced, power-operated rotary drive spindles mounted on said subdeck and projecting toward said main deck to positions laterally adjacent said rotary elements, one of said spindles being engageable with said one element in said firstmentioned tape support means, and being constructed and operable when so engaged to drive said one element at one spaced in its said selected direction, and the other spindle being engageable with the same said one element, and being constructed and operable when so engaged to drive such element at a speed greater than said one speed in its said selected direction, and further being engageable with said other element in said first-mentioned tape support means to drive it in its selected direction, shifting means operatively connected to said subdeck operable selectively to shift the same relative to said main deck toward a position placing said one drive spindle in driving engagement with said rotary element in said other tape support means to enable driving of such element in its said selected direction, and biasing means acting between said main deck and subdeck normally urging the two toward relative positions wherein said one spindle engages said one rotary element in said first-mentioned tape support means, and said other spindle is disengaged from both rotary elements in the first-mentioned tape support means, pivoting of said subdeck in said one direction under the influence of said translating and interaction means causing disengagement of said one spindle and said one rotary element in said first-mentioned tape support means and engagement of said other spindle and the same said one rotary element, and pivoting of the subdeck in the opposite direction under the same influence causing disengagement of said one spindle and the same said one rotary element, and engagement of said other spindle and said other rotary element in said first-mentioned tape support means.

* * * * *